United States Patent

[11] 3,616,347

| [72] | Inventor | William Andrew Haggerty<br>Cincinnati, Ohio |
| --- | --- | --- |
| [21] | Appl. No. | 719,452 |
| [22] | Filed | Apr. 8, 1968 |
| [45] | Patented | Oct. 26, 1971 |
| [73] | Assignee | The Cincinnati Milling Machine Co.<br>Cincinnati, Ohio |

[54] METHOD AND APPARATUS FOR ELECTROCHEMICALLY MACHINING ROTATING PARTS
16 Claims, 9 Drawing Figs.

| [52] | U.S. Cl. | 204/143, 204/217, 204/224 |
| --- | --- | --- |
| [51] | Int. Cl. | B23p 1/00, B23p 1/02 |
| [50] | Field of Search | 204/143, 224, 217 |

[56] References Cited
UNITED STATES PATENTS

| 3,243,365 | 3/1966 | Aikin | 204/143 M |
| --- | --- | --- | --- |
| 2,473,290 | 6/1949 | Millard | 204/424 |
| 3,287,245 | 11/1966 | Williams | 204/224 |
| 3,445,372 | 5/1969 | Fromson | 204/712 |

Primary Examiner—John H. Mack
Assistant Examiner—Neil A. Kaplan
Attorney—Marechal, Biebel, French & Bugg ABSTRACT: A method and apparatus for electrochemically machining workpieces, to form surfaces of revolution to precise shapes and dimensions, by rotating the workpiece on a pair of shoes engaging the surface being machined. An electrochemical machining tool is positioned between these shoes and adjusted to form a gap of a first predetermined distance into which electrolyte is forced at high velocity to complete an electrical path between the tool and the workpiece. A high-density flow of electrical current, typically 6,000 amperes per square inch, removes material anodically from the workpiece and, as the material is removed, the workpiece becomes smaller in diameter and thus moves toward the tool to decrease the gap distance. The current is maintained at the highest practical level by reducing the voltage as the gap distance decreases. By monitoring the voltage required to maintain the average current constant, the gap dimension can be measured remotely. Surface finishes of less than 5 microinches are obtainable using this process. The appearance of the surface of a workpiece electrochemically machined in this manner is improved in some cases by reducing the current density to between 1,500 and 3,000 amperes per square inch during at least the last revolution of the workpiece.

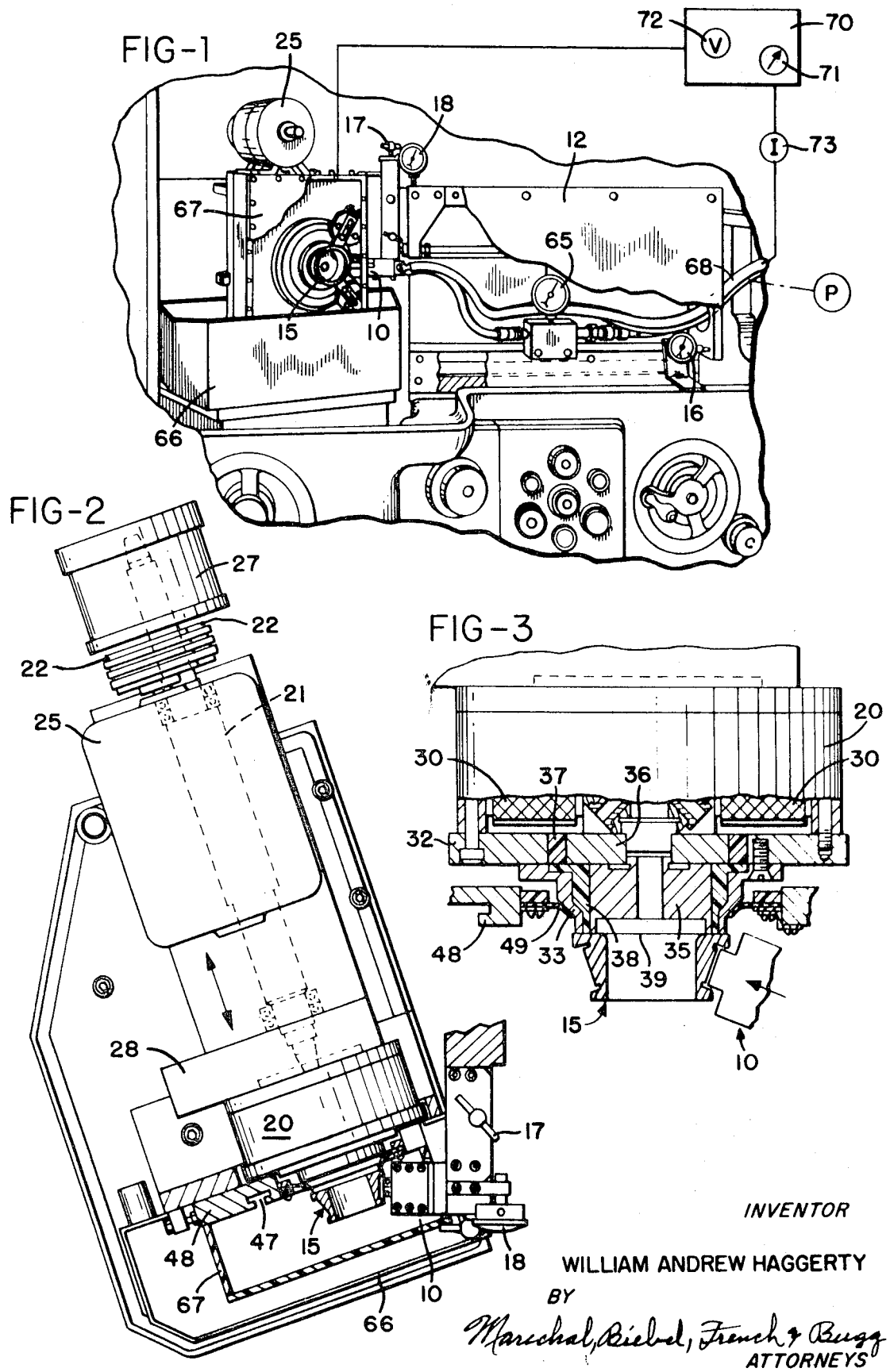

METHOD AND APPARATUS FOR ELECTROCHEMICALLY MACHINING ROTATING PARTS

RELATED APPLICATIONS

Reference is hereby made to U.S. Pat. applications, Ser. No. 719,450 entitled METHOD OF ELECTROCHEMICAL MACHINING and Ser. No. 719,451 entitled METHOD AND APPARATUS FOR ELECTROCHEMICALLY MACHINING ROTATING PARTS, both applications filed on even date herewith.

BACKGROUND OF THE INVENTION

In the preparation of the bearing races, usually the bearing is first formed by turning on a screw machine and then heat treated to carburize the outermost surface layer. The outside faces of the bearing are then ground parallel to each other to define the total length of the bearing. Finally, the bearing surface is rough ground to approximately the desired outside diameter, finish ground, and then honed to obtain proper surface finish and diameter. Each of these three last-mentioned steps requires separate machining operations.

It has been found that the several grinding operations can be eliminated or reduced by using the electrochemical machining process, and in this example the rough or finish grinding as well as the honing operation can be replaced and more accurately and more quickly accomplished by using electrochemical machining. Furthermore, more complicated surface configurations can be obtained by electrochemical machining, such as crowning the bearing surface to increase the load-carrying capacity of a bearing, with each part machined having exactly the same configuration as every other part since the tool which does the machining is not worn or in any way modified during successive machining operations.

SUMMARY OF THE INVENTION

This invention relates to a method and apparatus for electrochemically machining a workpiece to form a surface of revolution to precise dimensions and to smooth surface finishes. More particularly, the apparatus of this invention includes means to mount the workpiece so that it feeds itself automatically toward the electrochemical machining tool, and as a result, the exact dimension of the workpiece at any instant can be determined externally by reference to the voltage and current being supplied during the machining operation.

The surface finish can be controlled by proper adjustment of the current density, and it is part of this invention to machine the previously formed workpiece initially at the highest possible current density to provide smooth and highly polished surface finishes but which, as an inherent result, discolors the surface finish, and immediately prior to terminating the electrochemical-machining process to reduce the current density to a second, lower predetermined value for at least 1 revolution of the part to provide a bright surface finish which has a more pleasing appearance.

A magnetic face plate or chuck may be used to hold and to rotate the previously formed, conically shaped workpiece about a center of rotation on a pair of shoes engaging the bearing surface of the workpiece at spaced apart locations. The shoes are adjusted to displace the center of the workpiece away from the center of rotation of the chuck to cause the workpiece to be positively urged into engagement with the shoes as the workpiece is rotated by the chuck and material is removed from the bearing surface. Thus, the workpiece is held by the chuck for rotation while at the same time being allowed to slide continuously over a limited portion of the surface of the chuck during rotation. An electrochemical machining tool is mounted between the two shoes and positioned so that it is initially a predetermined distance from the surface of the finished workpiece at the conclusion of the electrochemical machining operation.

Once the tool is positioned, it remains fixed throughout the machining operation since the workpiece feeds itself automatically toward the tool as the workpiece material is electrochemically removed. This feature permits simplified construction of the machining apparatus, resulting in a lower cost of the apparatus and improved reliability.

High-velocity flow of electrolyte is forced between the tool and the workpiece under pressure to provide a path for current flow. The electrolyte also functions to remove the heat generated during machining and to remove the reaction products of the machining action. Electric current is then applied to the workpiece through the magnetic chuck and also to the tool to begin the machining operation.

As the material is removed from the workpiece, its diameter becomes smaller, and since it is supported by the two spaced-apart shoes, it will feed itself toward the tool thus decreasing the gap distance. The maximum current level used to machine the workpiece electrochemically is determined primarily by the current carrying capacity of the tool and associated electrical equipment. The higher the current density, the faster the machining rate and the better the surface finish of the workpiece. Therefore, the highest possible current densities are used in this invention with the maximum current being determined by the current carrying capacity of the tool.

When the workpiece is initially installed on the chuck for rotation, the workpiece may be out of round causing the gap distance between the workpiece and the tool to vary as the workpiece is rotated. Also, a differential taper may exist between the workpiece and the tool causing the gap distance to vary across the face of the tool. Since current density is a function of the gap distance for any given voltage, the current through the tool must be limited to a value below that which causes damage to the tool from melting, arcing, or distortion caused by the heat generated by the passage of current therethrough.

Preferably, with a gap distance of approximately 0.0015 inch existing between the tool and the workpiece at the completion of the machining operation, approximately 15 volts maintains a current density of approximately 6,000 amperes per square inch. At the beginning of the machining operation, however, the gap distance is three to four times the final gap distance, that is in the order of 0.006 inch, and therefore the voltage must be three to four times greater if the same high current density is to be maintained. However, using higher voltages may result in localized currents within the tool which exceed its current-carrying capacity, and therefore the power supply voltage is limited, at least during the initial rounding up of the workpiece, to a value which permits rapid removal of workpiece material while at the same time prevents damage to the tool. By riding on the support shoes, the initial machining operation effects rounding out of the part with minimum amount of stock removal.

Thus, as the workpiece is machined and the gap distance becomes smaller, the voltage between the tool and the workpiece is reduced in order to maintain the current density at a substantially constant high level. When the voltage is reduced to a predetermined value, indicating that the gap has been reduced to a predetermined distance, the workpiece is at its final diameter. Therefore, the voltage required to maintain the current at a constant high level is a direct indication of the diameter of the workpiece and may be referred to by the machine operator or by automatic equipment to determine when the electrochemical machining operation is to be terminated.

Alternatively, the workpiece could be machined by maintaining the voltage of the power supply at a constant value, such as 15 volts, throughout the entire machining operation. However, this would result in a lower initial current density, and consequently a lower initial machining rate. As the workpiece is machined, however, the gap distance will ultimately decrease and the current density will increase. With this method, automatic size control could be effected by monitoring the current while maintaining the voltage constant, and when the current reaches a predetermined level, indicating that the gap distance has been reduced to a predetermined distance, the machining operation could be terminated automatically through the use of appropriate current sensing circuits.

To obtain finishes on the workpiece in the order of 5 microinch, arithmetic average, the power supply used to supply current between the tool and the workpiece is substantially ripple free, that is, the variation in its voltage output is less than one-half percent, peak to peak. In the preferred embodiment, a variable voltage power supply is employed having a range of between approximately 0 to 36 volts, direct current, the voltage range being dictated by the current flow required to produce the desired machining rates and surface finishes, and by the current carrying capacity of the tool. While the voltage is adjustable, it is maintained at a specified constant voltage for at least one revolution of the workpiece to facilitate the rounding up of the workpiece.

An additional requirement for microinch finishes is a substantially pure electrolyte which may be obtained through conventional high-quality filtering means. In the preferred embodiment, the electrolyte is supplied to the gap between the tool and the workpiece at approximately ambient temperature and at a pressure in the order of 350 p.s.i. to obtain the flow rates necessary for proper temperature control and adequate removal of the reaction products of the machining operation.

Accordingly, it is an object of this invention to provide an improved electrochemical machining method and apparatus wherein a workpiece is automatically fed into the electrochemical machining tool during the machining operation to form a surface of revolution by rotating the workpiece on a pair of shoes which engage the machined surface of the workpiece, mounting an electrochemical machining tool between the shoes and forcing an electrolyte to flow at high velocity through the gap between the tool and the workpiece so that as the machining operation reduces the diameter of the workpiece, it will move toward the electrochemical machining tool.

It is another object of this invention to provide an improved electrochemically machining method and apparatus wherein surface finishes in the order of 5 microinch, arithmetic average, are obtained on a rotating workpiece by employing high-current densities from a substantially ripple free power supply to effect the electrochemical removal of the surface material of the workpiece. As the gap distance decreases during machining, the current density is maintained at a substantially constant high level by reducing the voltage between the workpiece and the tool. This voltage is a function of the workpiece diameter and may be used to determine when the workpiece has reached its desired diameter and the machining operation is to be terminated. Alternatively, as the gap distance decreases during machining, the voltage may be maintained at a constant value. The gap distance, and consequently the diameter of the workpiece, maybe determined from the magnitude of the current. Preferably, the final gap dimensions and voltage are selected so that the current density is sufficiently high to provide a smooth surface finish when the workpiece reaches its finished dimension.

It is another object of this invention to provide an improved method for electrochemically machining a workpiece to form a surface of revolution by rotating a workpiece on a pair of shoes, mounting an electrochemical machining tool between the shoes, supplying a high-velocity flow of electrolyte into the gap between the tool and the workpiece, providing a high-density electrical current from a substantially ripple free power supply to remove workpiece material anodically as the workpiece rotates past said tool, keeping the current density at a substantially constant high predetermined value by reducing the voltage until the voltage reaches a predetermined lower value indicating that the workpiece has been machined to the desired diameter, the current density being such that surface finishes in the order of less than 5 microinch, arithmetic average, result from the machining operation, and then reducing the current density to a lower predetermined value for at least one revolution of the workpiece immediately prior to terminating the machining operation to remove the discoloring effects which inherently results from machining at high current densities so that the resultant part has a bright appearance.

BRIEF DESCRIPTION OF THE DRAWINGS

FIG. 1 is a front elevational view showing the overall arrangement of the various components which comprise the electrochemical machining apparatus of this invention;

FIG. 2 is a plan view of the electrochemical machining apparatus showing the workpiece drive assembly, the workpiece, the electrochemical machining tool, and a portion of the mechanism supporting the tool;

FIG. 3 is a plan view partially in cross section of the electromagnetic chuck for holding the workpiece;

DESCRIPTION OF THE PREFERRED EMBODIMENT

Figure 4:
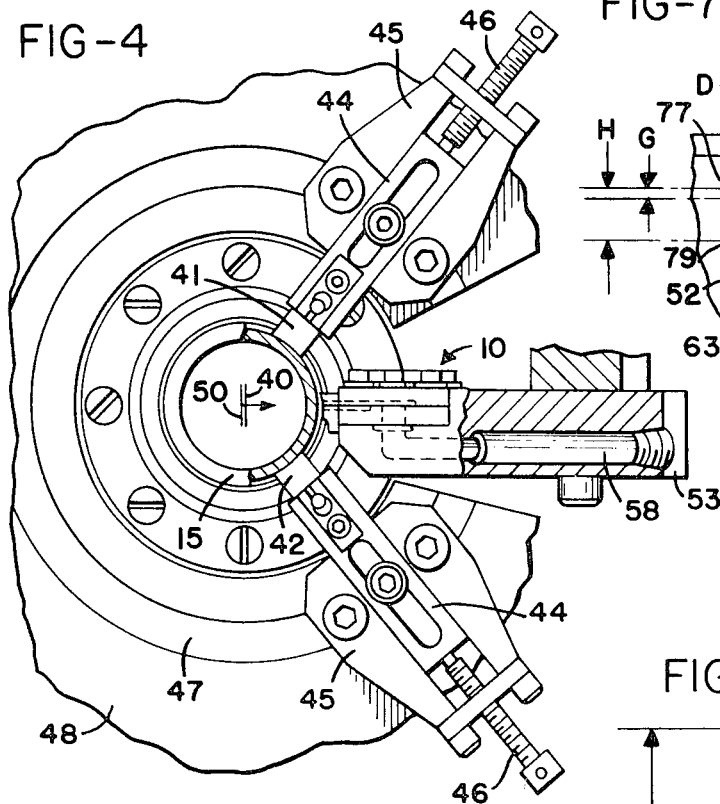
FIG. 4 is a front elevational view, with the workpiece partially in cross section, showing means slidingly engaging the machined surface of the workpiece at spaced-apart locations to displace the center of the workpiece from the center of rotation of the supporting magnetic chuck, and also showing, partially in cross section, the electrochemical machining tool.

Referring now to the drawings, and to Figs. 1 and 2 particularly, the electrochemical machining apparatus of this invention includes an electrochemical machining tool 10 mounted on a supporting means 12 which adjustably supports the tool relative to a workpiece 15. In the embodiment shown in these figures, the tool may be moved laterally by a crank, now shown, with the position of the tool being indicated by the gage 16, and vertically by turning the handle 17 with the position indicated by the gage 18. While the form of tool support shown is particularly useful, it is to be understood that other means of supporting the tool relative to the workpiece may be employed without departing from the scope of this invention. Once the position of the tool is adjusted properly, it will remain fixed throughout this machining operation.

The workpiece 15 is supported on a magnetic chuck 20 carried by a shaft 21, the latter being rotated by belts reeved on pulleys 22 attached to the shaft of the motor 25. A slip ring assembly 27, shown generally in Fig. 2, carries the electrical current for the electrochemical machining operation through the shaft 21 to the workpiece 15.

Referring to Fig. 3, the magnetic chuck 20 is energized by electrical current supplied through a slip ring assembly 28 which applies this current to a pair of coils 30 located within the chuck 20. The current through these coils generates a magnetic field which passes from one pole of the coils 30, through the cylindrical housing 31, an outer plate 32 to an outer collar 33, through the workpiece 15, an inner collar 35, an inner plate 36 and then to the other pole of the coils 30. A ring 37 of magnetically insulating material separates the plates 32 and 36 and an insulating collar 38 separates the collars 33 and 35. This arrangement permits the maximum number of magnetic lines of force to pass through the workpiece 15 thus holding it securely against the forward face 39 of the chuck 20. This face 39 is maintained relatively smooth to permit free lateral movement of the workpiece 15.

Referring now to Fig. 4, the workpiece 15 is displaced from the center of rotation 40 of the magnetic chuck 20 by means of two spaced-apart shoes 41 and 42 having a workpiece engaging surface preferably formed to the same contour as the surface of the workpiece 15 which will undergo the electrochemical machining operation. These shoes are constructed of a material, such as tungsten carbide or ceramic, having sufficient hardness so that they will not be appreciably worn by abrasion with the surface of the workpiece. Alternatively, these shoes may be rollers against which the workpiece is urged by a roller or belt type driver means.

Each of the shoes 41 and 42 preferably is pivotally attached to a radially extending arm 44 which may slide within a tool holder 45 and which may be positioned radially by the screw 46. The pivotal attachment between the arm 44 and the shoes permits the shoes to follow the workpiece generally as it is machined and moves toward the tool 10 due to the natural tendency for the center of the workpiece to align itself with the center of rotation. The holders 45 are adjustably mounted within a T-shaped slot 47 formed in a plate 48 (see also Fig. 2). The plate 48 has a generally circular opening in its central portion through which the collar 33 of the magnetic chuck 20 extends. A rubber gasket 49, shown in Fig. 3, extends from the plate 48 into the opening and engages the outer surface of the collar 33 to prevent electrolyte from flowing behind the plate 48 and into the magnetic chuck 20 or the rotating parts of the chuck structure.

The holders 45 are adjusted within the slot 47 at approximately a 120° angle with respect to each other and the shoes 41 and 42 are moved radially inwardly to displace the workpiece 15 along the line which generally bisects the angle between these two shoes. Initially, the center 50 of the workpiece is positioned approximately 0.025 inch from the center of rotation 40 of the magnetic chuck 20 for the part hereinafter described.

An electrochemical machining tool 10 is positioned approximately midway between the shoes 41 and 42 and is adjusted to provide a gap of a first predetermined dimension between the machining surface of the tool and the workpiece. Since the machined surface of the workpiece slidably engages the shoes 41 and 42, the center 50 of the workpiece will be urged toward the center of rotation 40, or to the right as viewed in Fig. 4, as the workpiece becomes smaller in diameter through the electrochemical removal of the workpiece material and thus decrease the gap distance between the tool and the workpiece.

The tool is positioned in line with the direction of movement of the center of the workpiece as the latter moves towards the center of rotation during reduction of its diameter due to the electrochemical removal of the workpiece material. As the gap distance decreases the current density will normally tend to increase. To prevent the current from exceeding the capacity of the tool, the voltage between the workpiece and the tool is correspondingly decreased either manually by the machine operator or automatically through the use of suitable electronic control circuits.

Figure 7:
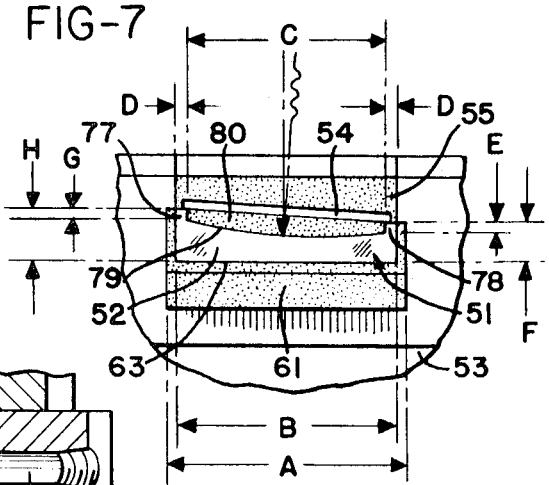
FIG. 7 is an enlarged end view of the electrochemical machining tool.
Figure 5:
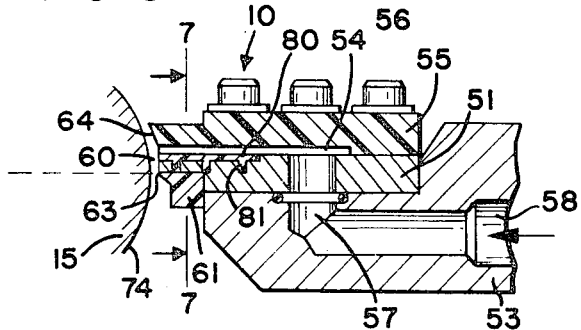
FIG. 5 is an enlarged cross-sectional elevational view of the electrochemical machining tool used in the preferred embodiment of the invention.
Figure 6:
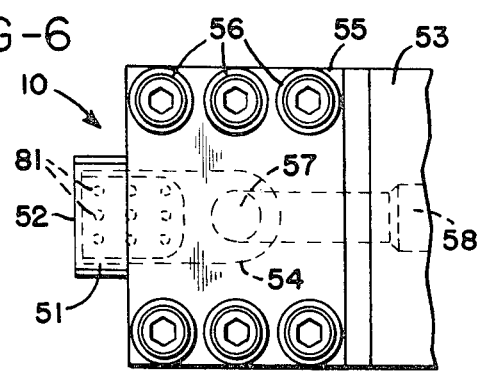
FIG. 6 is an enlarged plan view of the electrochemical machining tool.

The electrochemical machining tool is shown in Figs. 5 through 7 and includes an electrically conductive plate 51 having a frontal machining surface 52 which is machined and lapped flat. This electrically conductive plate may be made out of brass or other similarly easily machined metal capable of carrying high-current levels.

An electrolyte passage 54 is provided by mounting an upper insulating block 55 onto the plate 51 and securing both to a tool holder 53 by means of screws 56. This passage communicates with an opening 57 extending through the plate 51 into the tool holder 53. A passageway 58 in the tool holder carries the electrolyte from the supporting equipment into the tool, through the opening 57 and the passage 54 into the gap 60 between the tool and the workpiece.

An additional insulating block 61 is secured to the plate 51 in the area next to the workpiece to prevent any stray electric currents from machining the workpiece thereby limiting the machining action to the frontal surface 52 of the tool. This block is tapered away from the frontal machining surface thus increasing the gap dimensions allowing the electrolyte to escape from the machining area. Both the blocks 55 and 61 may be formed from a rigid and nonconductive fiberglass laminate, such as Formica type FF91, which also has low moisture absorption characteristics.

In the embodiment shown, the lower edge 63 of the tool is essentially straight and is aligned parallel to the axis of the workpiece with this edge being closer to the workpiece than any other portion of the tool. Preferably, when using a single tool, the frontal machining surface 52 is aligned perpendicular to the line between the center of the workpiece and the edge 63 of the tool.

The lower surface of the block 55 and the upper surface of the plate 51 are made relatively smooth in the area of the electrolyte passage 54 to facilitate the smooth flow of the electrolyte into the gap 60. Also, the frontal surface 64 of the insulating block 55 is curved or inclined as shown in Fig. 5 to provide a substantially constant gap distance and thus to urge the electrolyte to flow downwardly over the frontal machining surface of the tool as the workpiece rotates in a clockwise direction.

A high-velocity flow of electrolyte is supplied by a pump into the gap 60 formed between the plate 51 and the workpiece at a pressure of approximately 350 p.s.i. as observed by the gage 65. The particular electrolyte composition depends on the type of material being machined. For iron base materials, the electrolyte solution is prepared by mixing 4 pounds of sodium nitrate per gallon of water. This electrolyte is maintained at substantially ambient temperature, and as it passes from the gap 60, it is collected in a tank 66 (Fig. 1) located beneath the tool and returned to the recirculating equipment where the anodic products of the reaction are removed, as by a centrifugal separator, and where the electrolyte is cooled prior to being returned to the machining area. A shield 67 (Fig. 2) is constructed around the tool and workpiece in order to prevent the electrolyte from being sprayed on the machine operator and on the other components of the apparatus.

Power is supplied to the tool 10 through its tool holder, by means of cable 68, and to the workpiece through the slip ring assembly 27 and the shaft 21, with the workpiece being made anodic with respect to the tool. The power supply supplying the current between the tool and the workpiece is of conventional design, but of high quality since it must supply a variable direct current voltage and be essentially ripple free, that is, contain less than one-half of 1 percent, peak to peak, variation in its voltage level. An essentially ripple free power supply is necessary in order to obtain the accurate dimensioning and smooth surface finishes necessary for machining bearings. Furthermore, the power supply should have a response characteristic sufficient to hold the voltage constant over a five to one variation in current, the frequency of the variation being determined by the maximum speed of rotation anticipated. A 10 cycle per second response is considered sufficient for the embodiment described herein.

The power supply means 70 shown in Fig. 1 includes a voltage control 71, with the voltage output being indicated by the meter 72, and the current flow to the tool being indicated by the meter 73. While manual means are shown to adjust the voltage level, it is contemplated that automatic means may also be used.

The depth to which metal is removed during each revolution of the workpiece is determined by many factors including the rate of movement of the workpiece material relative to the face of the tool, the length of the tool face in the direction of relative movement, the voltage and gap between the tool and the workpiece, electrolyte composition and temperature, and the feed rate or relative radial motion between the tool and the workpiece. In the embodiment of the invention described herein, the rate of relative movement between the tool and the workpiece and the electrolyte composition and temperature are held constant by the supporting equipment, and the current density is maintained at a substantially constant level by reducing the voltage between the tool and the workpiece as the gap becomes smaller.

The magnitude of the peak current is maintained at a first predetermined level normally greater than 3,000 amperes per square inch and preferably in the order of 6,000 amperes per square inch until the diameter of the bearing surface reaches the desired dimensions. This high-current level is maintained in order to provide high rates of metal removal and a surface finish of less than 5 microinch, arithmetic average. However, a ferrous workpiece machined at these current levels using a sodium nitrate electrolyte will have a hay, strawlike appearance. Therefore, the current density is lowered to a second predetermined level, typically between 1,500 and 3,000 amperes per square inch, for at least one revolution of the workpiece to provide a bright appearance to the surface finish. Of course, for those materials and electrolyte combinations which do not show discoloration of the workpiece surface during machining at higher current densities, it is unnecessary to reduce the current to the lower, second predetermined magnitude.

The dimension of the workpiece may be determined by first adjusting the voltage as necessary to produce a predetermined current density. Thereafter, when the voltage drops to a predetermined value while still maintaining the predetermined current density, this indicates that the gap 60 has been reduced to a predetermined distance, ad at that time, the current flow is reduced momentarily and then terminated.

The length of the frontal machining surface in the direction of relative movement between the tool and the workpiece at the left end of the bearing surface 60 is made proportionately longer where the diameter of the workpiece is greater and therefore where the relative rate of movement between the workpiece and the tool is higher.

Figure 8:
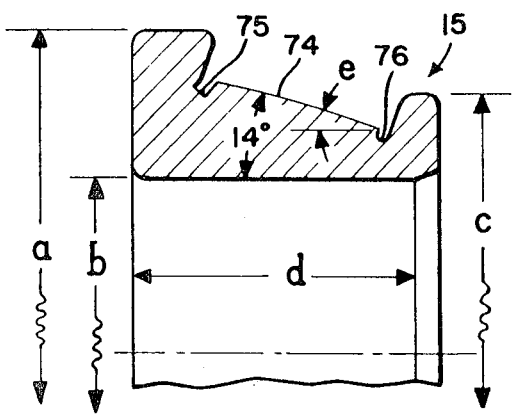
FIG. 8 is a view showing the principal dimensions of the workpiece.

A typical workpiece 15, such as a bearing race, is shown in Fig. 8. Adjacent each end of the bearing surface 74 are two recesses 75 and 76 which provide a relief at each end of the bearing surface. While a conically shaped workpiece is described, it is to be understood that any rotating workpiece may be machined according to the principles outlined therein. As shown in Fig. 7, the recesses 75 and 76 adjacent the bearing surface 74 are machined by extended portions 77 and 78 at the extreme edge of the tool where the time of exposure to the workpiece is proportionately longer.

The following table illustrates typical dimensions for the tool and the workpiece shown in Figs. 7 and 8.

| Tool | Workpiece |
| --- | --- |
| A—0.800 inch | a—3.000 inch |
| B—0.760 inch | b—1.500 inch |
| C—0.690 inch | c—1.750 inch |
| D—0.035 inch | d—1.500 inch |
| E—0.031 inch | e—14° |
| F—0.118 inch | |
| G—0.026 inch | |
| H—0.133 inch | |

The bearing surface 74 may be provided with a crown, for example of approximately 0.000050 inch, to facilitate the load-carrying ability of the bearing and to increase its life. Providing such a crown on the bearing surface by conventional grinding methods is possible for only a few bearings, and therefore may be costly in the production of a large number of bearings since the grinding tool must be resurfaced frequently. Using the electrochemical machining apparatus of this invention, the crown on the bearing surface is formed by modifying the area of the tool in the direction of relative movement by shaping of the frontal machining surface of the tool by milling, for example, since the depth of machining is proportional to the length of the tool in the direction of relative movement.

If the tool length in the direction of relative movement is changed by 0.001 inch, then the rate of metal removal is changed by 0.00001 inch, a factor of 100 to 1. In Fig. 7, the surface 79 is a curve formed on a 12-inch radius on the perpendicular bisector of the line joining the ends of the tool 51 as shown in Fig. 7. Thus, it is apparent that accurate machining of the tool to provide complicated surface configurations is well within the present state of the art, and the frontal machining surface of the tool is therefore maintained flat in order to remove any variations in machining rate due to the contour of the tool itself.

The material in the plate 51 which is cut away in order to provide the surface configuration for machining the particular workpiece shown in the drawings is filled with an insulating material 80, and the top surface of this material is machined flat with the top surface of the upwardly extending portions 77 and 78 to ensure smooth electrolyte flow in the passage 55.

The insulating material 80 also serves to prevent stray electrical currents from the interior surface of the tool from degrading the surface finish of the workpiece. Since the distance between the workpiece and these interior surfaces is much greater than the gap between the workpiece and the frontal surface of the tool, the current densities from inside the tool will be lower than from the frontal surface. If a lower current density flow of current were permitted, the surface would not be as smooth as possible, and in addition the surface would have a black appearance.

Any irregularities in the interface between the tool and the insulation or any discontinuity in the frontal surface of the tool where the insulation joins the tool could cause a poor surface finish since these irregularities may cause turbulence in the electrolyte flow across the face of the tube or permit stray currents to flow from an internal surface of the tool to the workpiece. A plurality of small holes 81 may be formed through the plate 51 in the area machined away in order to assist in bonding the insulating material 80 to the plate and to hold the material coplanar with the frontal surface of the tool.

This material 80 is an epoxy-type material (reaction product of epichlorohydrin and bisphenol A), and possesses essentially the same coefficient of thermal expansion as the material used for the tool. Additionally, the insulating material is nonporous, resistant to absorption of moisture for preventing passage of current through the insulating material to the workpiece, and relatively chemically inert with respect to the electrolyte being used. Typical insulating materials include a casting resin-type RP-3260 available from Renn Plastics, Inc., of Lansing, Michigan or STYCAST casting resin-type 2651 MM, available from Emerson and Cuming of Canton, Massachusetts.

In operation, the magnetic chuck 20 is energized and a workpiece 15 placed on its forward face 39. The workpiece is displaced by approximately 0.025 inch from the center of rotation of the chuck along a line which intersects the center of rotation of the chuck and the finishing edge 63 of the tool by adjusting the shoes 41 and 42 radially. The tool is positioned so that a gap of a distance exists between its frontal machining surface and the surface of the workpiece to be machined. Typically, this gap is in the order of 0.006 to 0.007 inch. This dimension depends, of course, on the diameter and out of round dimension of the workpiece. The workpiece in a typical run are generally preformed to within a predetermined tolerance so that once the tap distance is established for one workpiece, the same gap distance may be used for all workpieces within a single production run.

The motor 25 is then energized to rotate the workpiece at a speed of approximately 150 r.p.m. and the average peak current density between the workpiece and tool is adjusted to approximately 6,000 amperes per square inch. Electrolyte is fed into the gap between the tool and the workpiece at a pressure of approximately 350 p.s.i. which gives an electrolyte flow velocity in the order of 400 to 500 feet per second. This high-velocity flow ensures adequate removal of the reaction products of the electrochemical machining operation.

The voltage is continuously adjusted as the workpiece is machined and moves automatically toward the tool so as to maintain the current density constant, and when the voltage reaches a predetermined lower value, indicating that the gap has been reduced to a second predetermined distance, typically 0.0015 inch, and thus the workpiece has been machined to its desired dimension, the current density is lowered momentarily, that is for at least one revolution of the workpiece, to a second lower predetermined magnitude typically between 1,500 and 3,000 amperes per square inch to provide the machined surface with a bright appearance, and then the current is abruptly terminated to stop the electrochemical machining operation. Since the workpiece rotates at a relatively high speed, the amount of material removed during each revolution is small, in the order of 0.000010 inch, and therefore when the current is removed, the discontinuity in the workpiece surface is also small.

Figure 9:
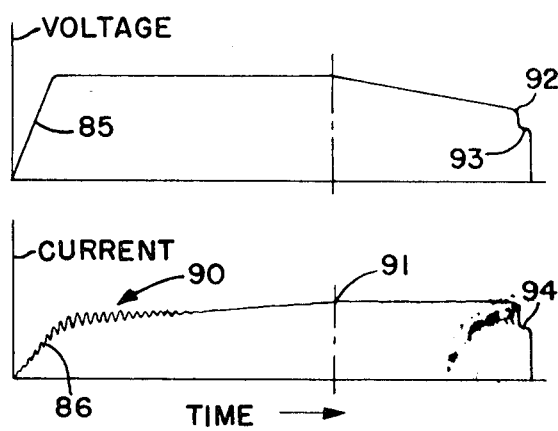
FIG. 9 is a graph showing the voltage between the tool and the workpiece, and the current flow during the machining operation with respect to time.

Fig. 9 shows the relationship between the voltage and current during the machining operation with respect to time. At the start of the electrochemical machining operation, the voltage, which is shown by curve 85 is rapidly increased with a corresponding rapid increase in the current, as shown by curve 86. This increase may be as fast as one second or less. Since the power supply which was used during the machining operation of this example had a maximum voltage of 36 volts, the current did not obtain the desired high level initially. While this limitation in the capacity of the power supply existed in the embodiment described herein, it is obvious that a higher capacity power supply could be used to achieve the same results.

As shown generally at 90, the current fluctuates between two values indicating that the workpiece is out of round and therefore the gap distance is constantly changing as a result of the rotation of the part. As the machining operation continues, however, this fluctuation decreases indicating that the part is becoming round. As described previously, the power supply maintains its voltage constant for at least one revolution of the part so that the instantaneous value of the current is allowed to vary, thus machining the high spots on the workpiece at a faster rate than the low spots.

As workpiece material is removed, the gap becomes smaller, and as a result the current increases slowly until it reaches the first predetermined magnitude. The voltage remains constant during this time. When the peak current reaches its predetermined high level, shown at 91, it is maintained at that level by continuously reducing the power supply voltage as the gap dimension decreases. Once the voltage level has been reduced to a predetermined level, as indicated at 92, indicating that the part has now been machined to its desired dimensions, the voltage is reduced to a second magnitude 93, to reduce the current to a second predetermined magnitude at 94 for at least one revolution of the workpiece. The voltage is then reduced to zero as quickly as possible, as by opening the circuit by a relay, or by shorting the output of the power supply, to remove the flow of current and thus prevent any machining at a current density lower than the second predetermined current density. This preserves the appearance of the surface and its surface finish. Termination of the current in less than 100 microseconds is desired in order to minimize the thickness of the black line appearing on the surface. A line having a thickness of less than 0.001 inch is considered acceptable. With presently available equipment and techniques, the current may be brought to a zero value within approximately 10 microseconds.

Using the techniques described above, the self-feeding feature of this invention permits bearings to be machined to within 0.0001 inch of a desired diameter, within an out of round tolerance of less than 0.000060 inch, and a surface finish of 5 microinch, arithmetic average.

Although the invention has been described with reference to machining the exterior surface of a bearing, it will be understood by those skilled in the art that the procedures and apparatus heretofore described may be used to machine the inside surface of a bearing member, or the like. It is also clear that both the interior and exterior surfaces may be machined simultaneously using the procedure and apparatus previously described.

While the method and form of apparatus herein described constitutes a preferred embodiment of the invention, it is to be understood that the invention is not limited to this precise method and form of apparatus, and that changes may be made therein without departing from the scope of the invention which is defined in the appended claims.

What is claimed is:

1. A method for electrochemically machining a workpiece to a precise final predetermined dimension and to form thereon a surface of revolution having a high-surface finish, said method comprising the steps of
   positioning a workpiece on a pair of spaced apart shoes such that said surface of revolution is in contact with said shoes;
   positioning an electrochemical machining tool adjacent the workpiece and between the shoes to form a gap between said tool and workpiece of first dimension;
   supplying an electrolyte for flow through said gap at a high velocity;
   rotating the workpiece on said shoes relative to said tool; and
   connecting a source of variable voltage to cause current flow between said tool and the workpiece such that the workpiece is anodic with respect to said tool to remove metal from the workpiece electrochemically as it rotates past said tool for reducing the diameter of the workpiece and to decrease said gap to a second dimension less than said first dimension, and said reduction in diameter of the workpiece being operative to advance the workpiece automatically toward said tool.

2. A method as set forth in claim 1 wherein said second dimension is related to the precise final predetermined dimension of the workpiece and further including
   maintaining one of said current flow and voltage constant during reduction of the workpiece diameter;
   monitoring the variable as an indication of said gap dimension during reduction of the workpiece diameter; and
   terminating said current flow when said gap reaches said second dimension to provide a workpiece of said precise final predetermined dimension.

3. The method set forth in claim 2 wherein said current flow is maintained constant to provide a constant current density, and wherein said voltage is varied.

4. The method set forth in claim 2 wherein said voltage is maintained at a constant value, and wherein said current flow is varied.

5. The method set forth in claim 2 wherein said current flow is maintained at a value sufficient to provide a current density greater than 3,000 amperes per square inch.

6. The method as set forth in claim 2 wherein said current flow is maintained at a value sufficient to provide a current density of approximately 6,000 amperes per square inch.

7. The method set forth in claim 2 further including the step of lowering the magnitude of the current flow to a predetermined level for at least one revolution of the workpiece to provide a bright surface finish after the gap between the workpiece and the tool has been reduced to said second dimension.

8. The method as set forth in claim 7 wherein the magnitude of said predetermined level of current flow is between 1,500 and 3,000 amperes per square inch.

9. The method as set forth in claim 1 wherein said first dimension between the tool and the workpiece is in the order of 0.006 inch and wherein said second dimension is in the order of 0.001 inch.

10. The method set forth in claim 1 in which the step of positioning the workpiece includes the steps of
    mounting a pair of shoes to engage the surface of the workpiece to be machined at spaced-apart locations, and adjusting the shoes to displace the center of the workpiece away from the fixed axis of rotation thereby causing the workpiece to be positively urged toward the electrochemical machining tool as the workpiece is rotated.

11. The method set forth in claim 10 wherein said shoes are adjusted to displace the center of the workpiece away from the axis of rotation by approximately 0.025 inch prior to commencement of the electrochemical machining of the workpiece.

12. Apparatus for electrochemically machining a workpiece to a precise final predetermined dimension and to form thereon a surface of revolution having a high-surface finish comprising
- means for rotating the workpiece about a fixed axis of rotation;
- means for engaging and supporting the surface of the workpiece being machined at two spaced-apart locations;
- means for mounting an electrochemical machining tool between said engaging and supporting means and spaced from the workpiece to form a gap therebetween;
- means for supplying a high-velocity flow of electrolyte to said gap; and
- means for supplying electrical current to said tool and the workpiece such that the workpiece is anodic with respect to said tool so that workpiece is anodic with respect to said tool so that workpiece material is electrochemically removed from the workpiece as it rotates past said tool, and as the material is removed, the workpiece becomes smaller in diameter and thus moves toward the tool, decreasing said gap between said tool and the workpiece.

13. The apparatus as set forth in claim 12
- wherein said means for rotating the workpiece includes a magnetic chuck having a smooth workpiece-engaging portion to permit the workpiece to be held for rotation while sliding on said engaging portion; and
- wherein said means for engaging and supporting the workpiece includes two spaced-apart shoes slidingly engaging the surface of the workpiece being machined, said shoes being adjusted to displace the center of the workpiece away from the fixed axis of rotation to cause the workpiece to be positively urged against said shoes as the workpiece is rotated and thus to move toward said electrochemical machining tool as the workpiece becomes smaller in diameter.

14. The apparatus as set forth in claim 12 wherein said electrochemical machining tool has an essentially flat frontal surface for machining the workpiece, said tool further including insulation surrounding said frontal surface and coplanar therewith; and
- wherein said means for supplying electrolyte includes an insulated electrolyte channel in said tool having an exit port the length of and coplanar with said frontal surface whereby a high-velocity flow of electrolyte is caused to flow across the entire machining surface of the tool and into the space between the tool and the workpiece to provide a path for the flow of electrical current and to remove the heat and the reaction products generated during the electrochemical machining action.

15. The apparatus as set forth in claim 12 further including means monitoring the current flow and voltage between the tool and the workpiece so that the electrochemical machining operation may be terminated when the gap decreases to a predetermined dimension indicating that the workpiece has been machined to a precise final predetermined dimension.

16. The apparatus as set forth in claim 12 wherein said means for supplying electrical current includes a variable voltage power supply that is essentially ripple free, having less than one-half of 1 percent voltage variation, peak to peak, of the operating voltage.

* * * * *